US006720933B2

(12) United States Patent
Hanlin et al.

(10) Patent No.: US 6,720,933 B2
(45) Date of Patent: Apr. 13, 2004

(54) DUAL BAND SATELLITE COMMUNICATIONS ANTENNA FEED

(75) Inventors: John Joseph Hanlin, Worcester, MA (US); Yueh-Chi Chang, Northboro, MA (US); Richard Henry Holden, Maynard, MA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/315,608

(22) Filed: Dec. 10, 2002

(65) Prior Publication Data

US 2004/0036661 A1 Feb. 26, 2004

Related U.S. Application Data

(60) Provisional application No. 60/405,217, filed on Aug. 22, 2002.

(51) Int. Cl.[7] .......................... H01Q 13/00; H04B 1/52

(52) U.S. Cl. ....................................... 343/786; 333/118

(58) Field of Search ................................ 343/785, 786, 343/791; 333/118

(56) References Cited

U.S. PATENT DOCUMENTS 5,625,368 A * 4/1997 Howson et al. ............. 343/753
6,323,819 B1 * 11/2001 Ergene ....................... 343/786
6,600,387 B2 * 7/2003 Cook et al. ................ 333/126

* cited by examiner

*Primary Examiner*—Don Wong
*Assistant Examiner*—Minh Dinh A
(74) *Attorney, Agent, or Firm*—Daly, Crowley & Mofford, LLP

(57) ABSTRACT

An antenna feed that transmits in a single vertical or horizontal linear polarization at commercial Ka-band while simultaneously receiving both vertical and horizontal polarizations at commercial KU-band is presented. The antenna feed includes a metal feed horn, an integrated corrugated ring filter, an outer conductor disposed coaxially about the feed horn, a hollow inner conductor disposed coaxially within the feed horn and a polyrod disposed within the hollow inner conductor. The antenna feed further includes a PCB having receive channel RF probes, 180-degree hybrid combiners and LNB circuitry. The PCB is surrounded by a housing which is attached to the feed horn.

18 Claims, 13 Drawing Sheets

DUAL BAND SATELLITE COMMUNICATIONS ANTENNA FEED

CROSS REFERENCE TO RELATED APPLICATIONS

This application claims priority under 35 U.S.C. §119(e) to provisional patent application serial No. 60/405,217 filed Aug. 22, 2002; the disclosure of which is incorporated by reference herein.

STATEMENT REGARDING FEDERALLY SPONSORED RESEARCH

Not Applicable.

FIELD OF THE INVENTION

The present invention relates generally to an antenna feed and more particularly to an antenna feed for dual band satellite communications.

BACKGROUND OF THE INVENTION

Broadband satellite networks compete with terrestrial and wireless technologies in offering Internet access and backbone transport telecommunications services. There are a number of advantages and some disadvantages of broadband satellite networks versus fiber, Digital Subscriber Loop (DSL), cable modems and Local Multipoint Distribution Service (LMDS) offerings. In general, the advantages of satellite systems over these alternatives are ubiquitous coverage, simplicity, bandwidth on demand, uniformity, asymmetry, low cost global coverage and rapid deployment for global services. The determination of which service to offer a given subscriber is determined by which service is most cost effective to meet the user needs. The broadband satellite cost advantage increases as the density of the population decreases and as the deployment of broadband services increases over a larger area.

The total growth of the VSAT (very small aperture terminal) market is projected to be more than 30% per year over the coming five-year period. Industry analysts predict that the traditional VSAT business sector will achieve 18.2% annual growth over the next five years while broadband VSAT applications for consumers are projected to achieve more than 130% annual growth over the same period. It is also expected that by the year 2003 more than 2.5 million U.S. consumers will have installed broadband direct satellite Internet access terminals based on Ku/Ka-band systems. It is further expected that the global market for residential (consumer) satellite terminals will increase from $2.35 billion in 2000 (principally Direct Broadcast Satellite (DBS) television) to approximately $8.2 billion in 2005 (integrated Internet, voice and television).

Existing art in the area of interactive video and Internet satellite communications (SATCOM) terminals has typically utilized bulky expensive waveguide-based feed components and multiple antenna feeds in order to meet the multi-band, multiple polarization requirements of such terminals.

In view of the above, it would be desirable to provide a mass-producible, low-cost, dual frequency band antenna feed for interactive video and Internet satellite communications terminals that will transmit in a single vertical or horizontal linear polarization (selectable at installation) at commercial Ka-band while simultaneously receiving both vertical and horizontal polarizations at commercial Ku-band.

SUMMARY OF THE INVENTION

An antenna feed that transmits in a single vertical or horizontal linear polarization at commercial Ka-band while simultaneously receiving both vertical and horizontal polarizations at commercial Ku-band is presented. The antenna feed includes a metal feed horn, an integrated corrugated ring filter, an outer conductor disposed coaxially about the feed horn, a hollow inner conductor disposed coaxially within the feed horn and a polyrod disposed within the hollow inner conductor. The antenna feed further includes a printed circuit board (PCB) having receive channel radio frequency (RF) probes, hybrid combiners and low-noise block (LNB) circuitry. The PCB is surrounded by a housing which is attached to the feed horn.

BRIEF DESCRIPTION OF THE DRAWINGS

The invention will be more fully understood from the following detailed description taken in conjunction with the accompanying drawings, in which.

DETAILED DESCRIPTION OF THE INVENTION

The present invention comprises a low-cost, dual frequency band antenna feed for a broadband satellite communications (SATCOM) terminal for video and two-way Internet multi-media. The antenna feed transmits in a single vertical or horizontal linear polarization (selectable at installation) at commercial Ka-band (29.5 to 30 GHz) while simultaneously receiving both vertical and horizontal polarizations at commercial Ku-band (10.7 to 12.75 GHz). The antenna feed is a significant advance over the prior art as it replaces older waveguide-based technology with newer printed circuit technology. Using a coaxial horn construction, hollow inner conductor, integrated corrugated ring filter, and die-cast parts allows built-in diplexing of the two bands with multiple polarizations in a compact, low cost, and mass producible feed with many desirable antenna feed characteristics.

The present invention solves the problems described above by using a coaxial configuration with a hollow inner conductor and polyrod for the high frequency transmit band and integrating the low frequency receiver front-end LNB with printed probes to receive vertical and horizontal polarizations directly from the coaxial feed. The invention uses a double-sided microstrip printed circuit board (PCB) that provides plenty of room in a small physical space for LNB surface-mount components that can be applied with automated machinery. The design of the feed horn corrugations, the proximity of the tip of the inner conductor, and the shape and length of the polyrod allowed adjustment of the phase centers and beamwidths in both frequency bands. The presently disclosed antenna feed further provides a built-in diplexing function, separating the transmit and receive frequencies. The plane of the PCB is mounted perpendicular to the axis of the coaxial feed and a hole is provided in the PCB for the hollow inner conductor and the transmit path to pass directly through. Two 180-degree hybrid combiners and two pairs of printed probes, one set per polarization on opposite sides of the PCB, couple receive band energy directly from the coaxial portion of the feed. Accordingly, no external waveguide components are required for this feed.

Figure 1:
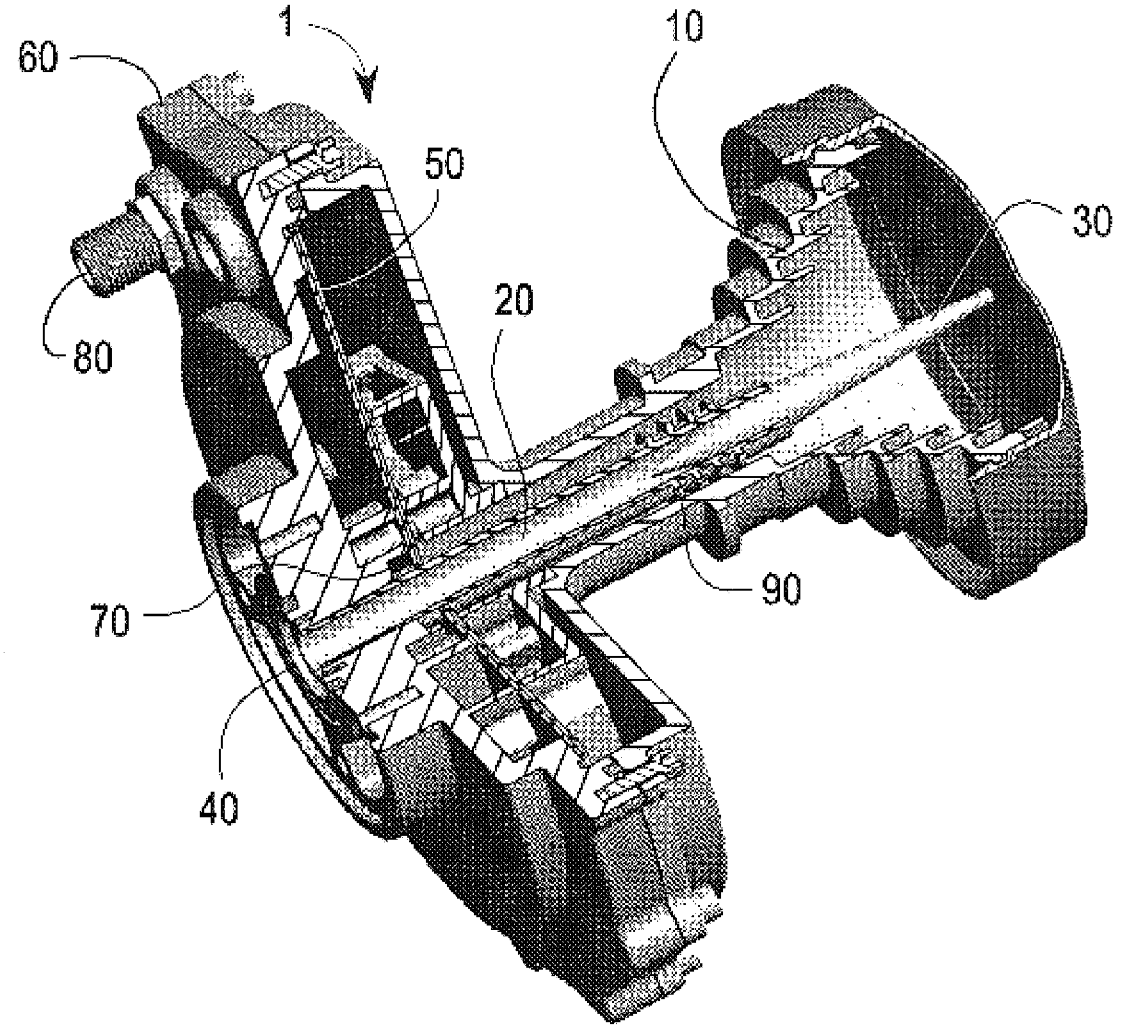
FIG. 1 is a sectional view of the antenna feed of the present invention.
Figure 2:
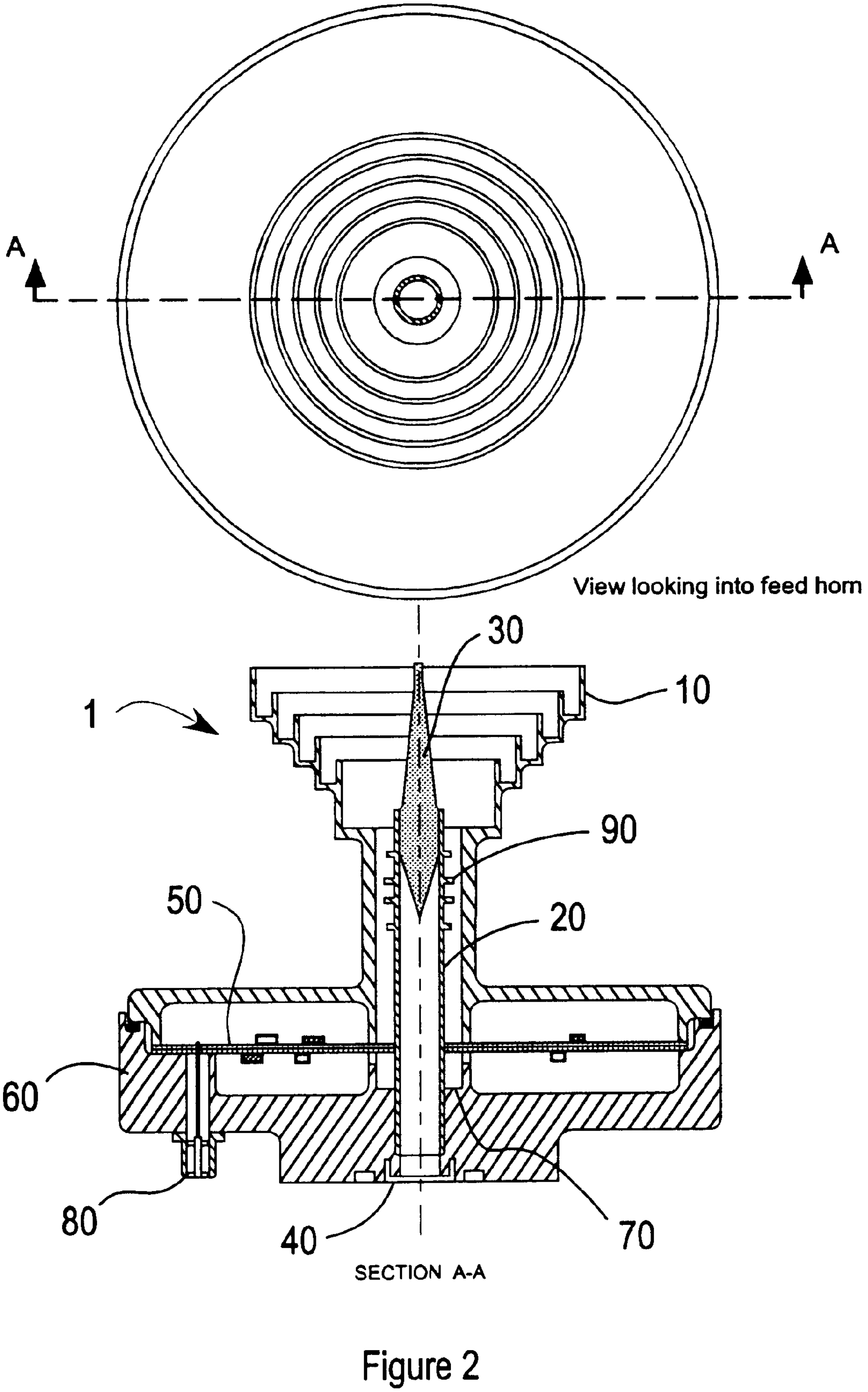
FIG. 2 is a cross-sectional diagram of the antenna feed without the feed cover.
Figure 3:
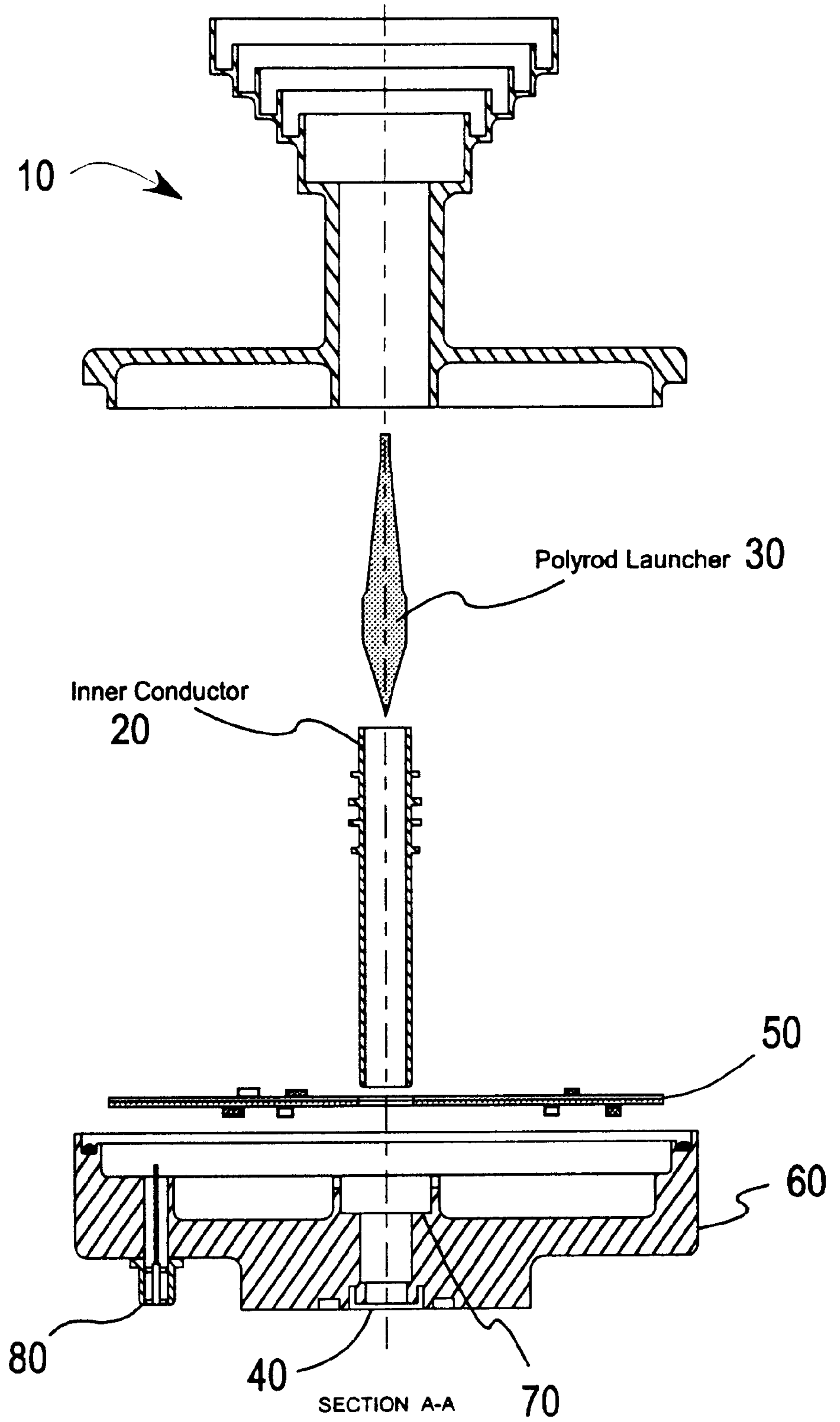
FIG. 3 is an exploded cross-sectional view of the present invention.
Figure 4:
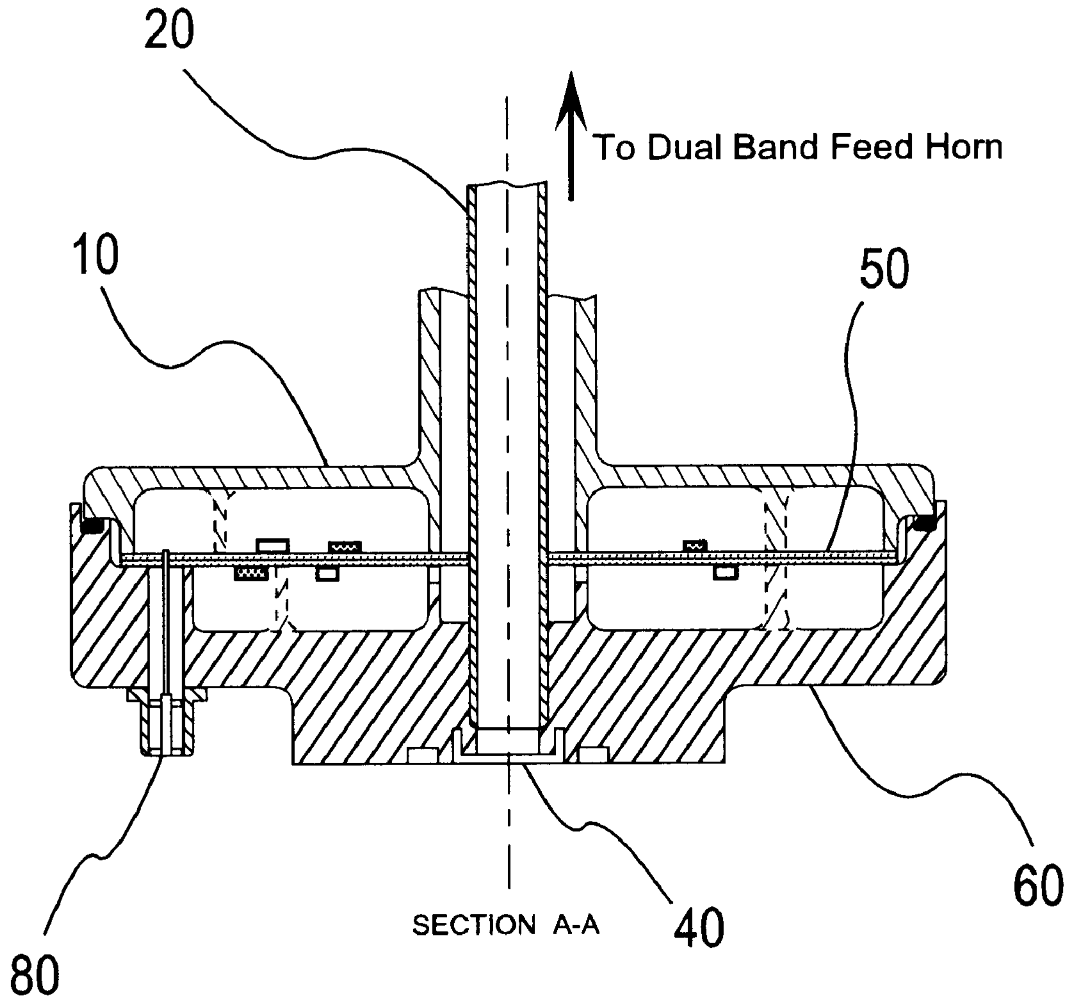
FIG. 4 is a cross-sectional view of the base of the antenna feed showing the PCB.
Figure 5:
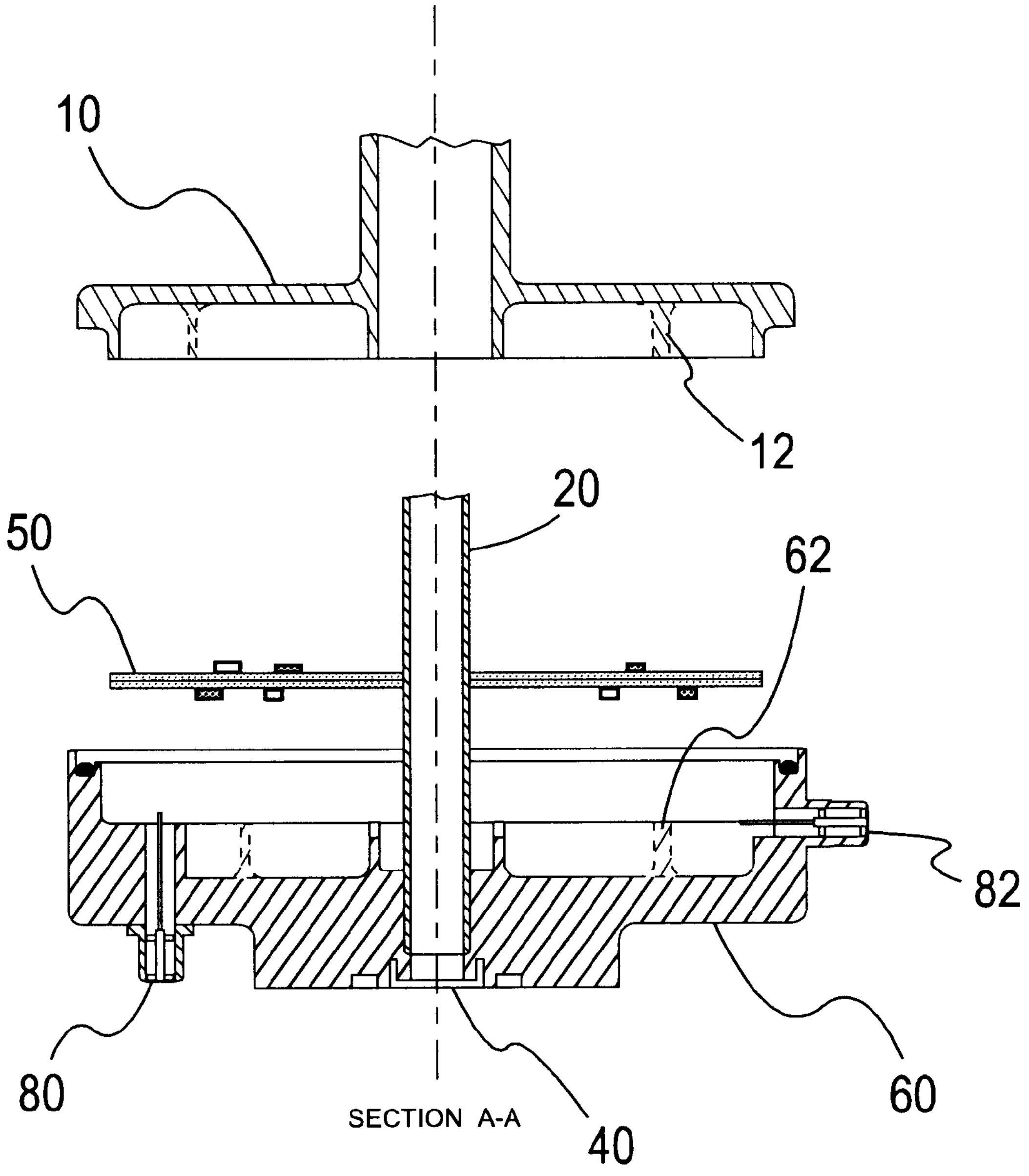
FIG. 5 is an exploded cross-sectional view of the base of the antenna feed.

A sectioned view of the antenna feed 1 is shown in FIG. 1, and a cross-sectioned view of the invention and an exploded view showing the major components are given in FIGS. 2 and 3 respectively. Sectional views of the antenna feed 1 are shown in FIGS. 4 and 5 as well. The dual band horn portion of the invention comprises a corrugated metal horn 10 and outer conductor with a hollow metal inner conductor 20 coaxially placed inside the horn and extending into the horn throat. Into the end of the hollow inner conductor is placed a snug-fitting dielectric plug or polyrod launcher 30, a portion of which is internal and with a conic taper and a portion of which is exposed outside the tip of the inner conductor and shaped to provide the proper beamwidth and match at Ka-band.

A flange 40 is provided at the base of the unit for direct attachment of a Ka-band microwave upconvertor and solid-state amplifier whose signals are transmitted in a short, low-loss, and direct path through the hollow inner conductor and polyrod launcher and out the feed horn. The linearly polarized transmitter may be attached to the antenna feed in one of two orthogonal orientations allowing selection of either vertical or horizontal transmit polarization at installation.

Proper shaping and relative placement of the polyrod 30 and the tip of the inner conductor tube with respect to the horn aperture and the particular selection of the number, radii, and depth of the horn corrugations shown provide substantially equal E-plane and H-plane radiation pattern beamwidths of 70-degrees for both frequency bands. This offers low cross-polarization and improved reflector illumination efficiency that is independent of feed rotational orientation. These same components allow co-located phase centers for both frequency bands, a requirement for high efficiency and low co-boresight loss while maintaining focus in both bands without further mechanical adjustment when this antenna feed is mounted in the terminal reflector antenna optics. In the traditional approaches of prior art expensive and bulky waveguide components and multiple antenna feeds are required with costly alignment in the field. In addition, a multi-ring corrugated coaxial filter 90 for rejecting the transmit band is integrated with the inner conductor in the throat of the feed horn in the invention. This improves the band-to-band isolation without taking significant space.

The antenna feed integrates the receiver front-end into the body of the feed itself. By incorporating the LNB electronics on a printed circuit board (PCB) 50 that is mounted so the plane of the board is perpendicular to the coaxial axis of the feed, copper probes printed onto the board will capture the Ku receive band signal from the feed coaxial region directly onto the PCB (see FIGS. 3–9 and FIGS. 11–14). A hole in the center of the PCB allows the inner conductor tube to pass directly through the board maintaining the short transmit path. Two 180-degree hybrid combiners 56, 57 and two pairs of printed probes 58, 59, one set per polarization on opposite sides of the PCB 50, couple receive band energy directly from the coaxial portion of the feed.

Figure 10:
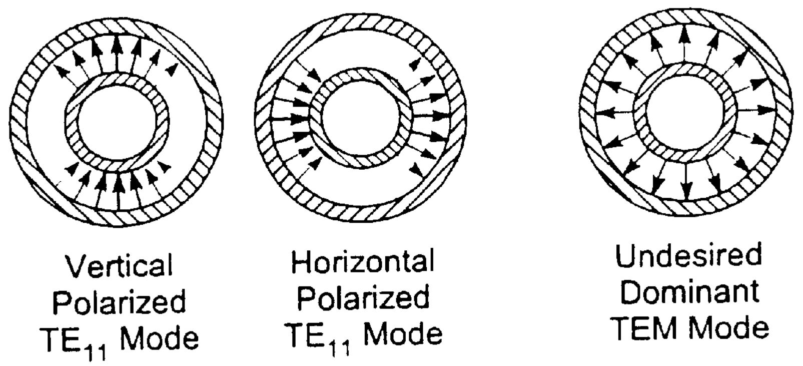
FIG. 10 is a depiction of vector fields in a coaxial transmission line.
Figure 11:
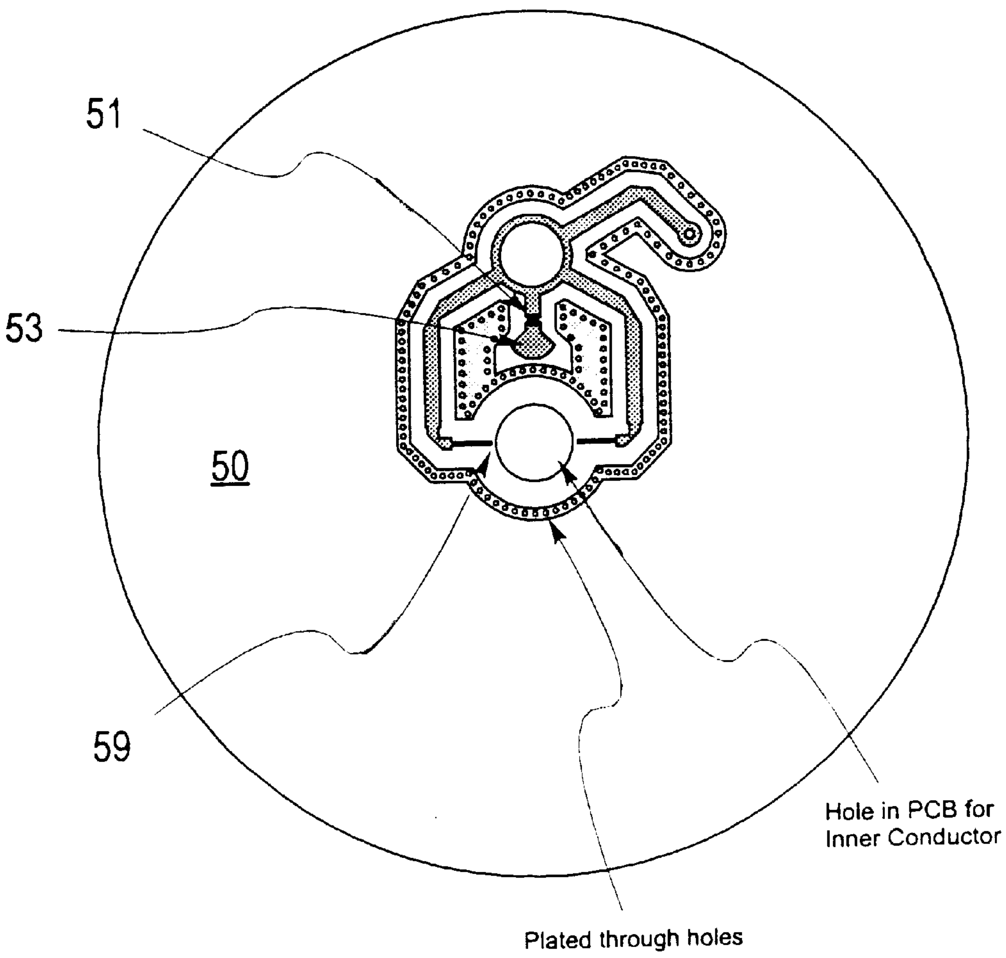
FIG. 11 is a diagram of the bottom of the PCB.

In a typical antenna feed the desired radiation pattern has a beam maximum oriented along the axis of the feed and this is achieved by coupling to the first coaxial transverse electric ($TE_{11}$) mode. Unfortunately, the dominant transverse electromagnetic (TEM) mode is the easiest to excite in a coaxial transmission line (see FIG. 10). This TEM mode is not polarizable in a particular direction and produces an undesirable null in the radiation pattern along the axis of the feed. In this invention the use of pairs of probes and a hybrid combiner for each polarization provide direct coupling to the desired $TE_{11}$ mode and the required high isolation from the undesired but dominant TEM coaxial mode. Without using the above-described configuration it is not practical to use direct probe coupling in a coaxial feed structure due to the strong coupling to the dominant TEM mode. The $TE_{11}$ mode induces currents onto the pair of probes 58, 59 that are 180-degrees out-of-phase and the ratrace hybrid combines these signals out its delta or difference port. The TEM mode, on the other hand, induces in-phase currents in the pair of probes 58, 59 and these are isolated at the sum port of the hybrid as shown in FIGS. 10 and 11. Further, the two pairs of probes 58, 59 are rotated 90-degrees relative to each other with one pair dedicated to one $TE_{11}$ polarization and the other to the orthogonal $TE_{11}$ polarization allowing the simultaneous reception of both vertical and horizontal polarizations.

In its lowest cost implementation, the invention uses a double-sided microstrip PCB composed of two boards, each copper clad on both sides, bonded at their ground planes. A pair of probes 58 and a 180-degree ratrace hybrid combiner 56 are etched onto the upper side of the PCB while a nearly identical pair of probes 59 and hybrid 57, rotated 90-degrees from the first, are etched onto the exposed lower side of the bonded board. An etched coaxial RF via 55 is supplied after the combined signal at the delta output of the lower hybrid to bring the signal up to the top of the upper board for distribution to the remainder of the LNB electronics (see FIGS. 6, 7,8, and 9). The details of the LNB electronics are not shown here for clarity. FIG. 5 shows an LNB output connector 80 located at the bottom of the antenna feed assembly. Optionally, the LNB output connector 82 may be located on a side of the antenna feed assembly in an end-launch configuration from the PCB.

The LNB board is enclosed in a sandwich between a die-cast aluminum lower housing base 60 and a die-cast aluminum feed horn 10 and upper outer conductor housing as shown in FIGS. 1 through 9. The upper and lower housings contain channels 12, 62 cast into their surface whose walls straddle the path of and enclose the microstrip traces on the upper and lower microstrip boards (see FIGS. 5, 6, and 9). Copper strips or "isolation" traces 52 are etched adjacent to the microstrip lines on either side. These "isolation" traces contain a multitude of small holes that are plated through to the bonded ground planes. The walls of the cast channels are situated above and below these "isolation" traces on the upper and lower sides of the PCB, respectively, and make contact with the grounded "isolation" traces, thus grounding the channel walls and completely enclosing them for improved isolation. These "isolation" traces with their plated-thru holes and the cast housing walls are especially important in the central coaxial region of the feed as they, along with the inserted inner conductor tube, provide a continuation of the central feed coax through the double-sided PCB (see FIGS. 5,6,7,8,9, 11, 12, and 13). Such channeling of the microstrip is used throughout the LNB electronics board, as necessary, to improve the isolation of adjacent lines with no significant increase in the cost of the board or the overall antenna feed. For increased design flexibility the channels may also be die-cast into separate upper and/or lower sub-covers that sandwich the PCB and fit inside the upper and lower housing, respectively.

Figure 6:
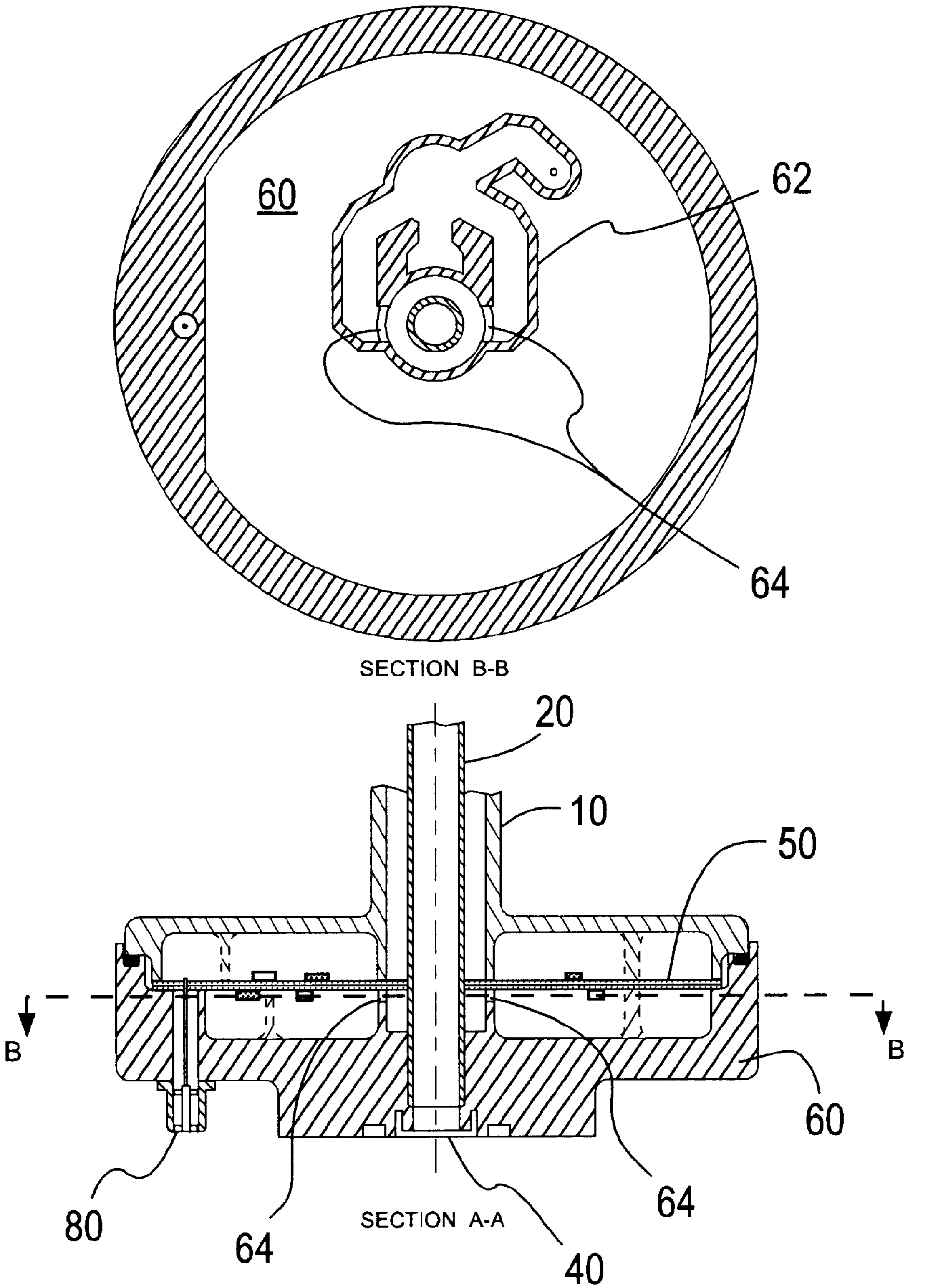
FIG. 6 is a cross-sectional view of the base below the PCB.
Figure 7:
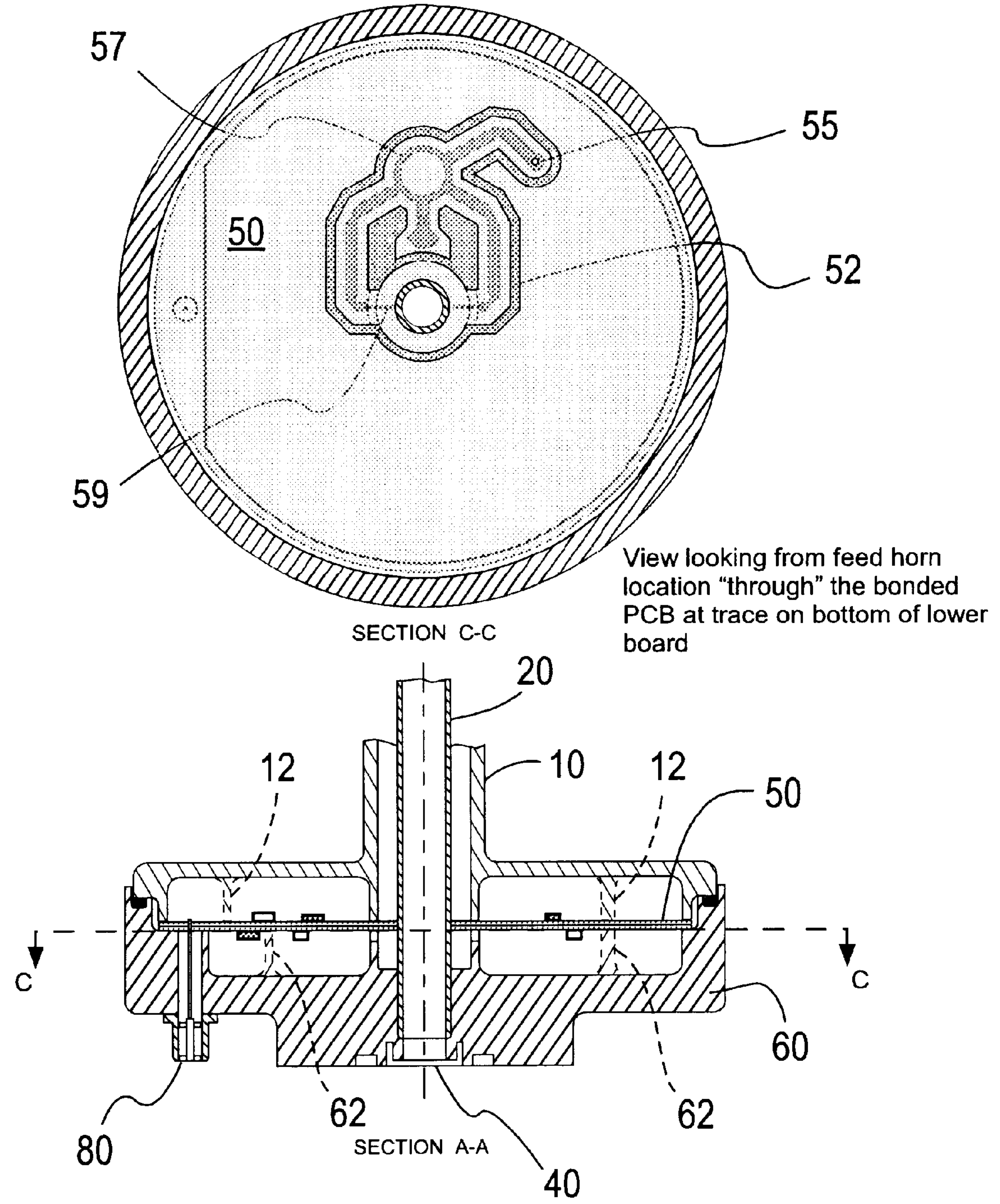
FIG. 7 is a cross-sectional view of the base at the bottom surface of the PCB.
Figure 8:
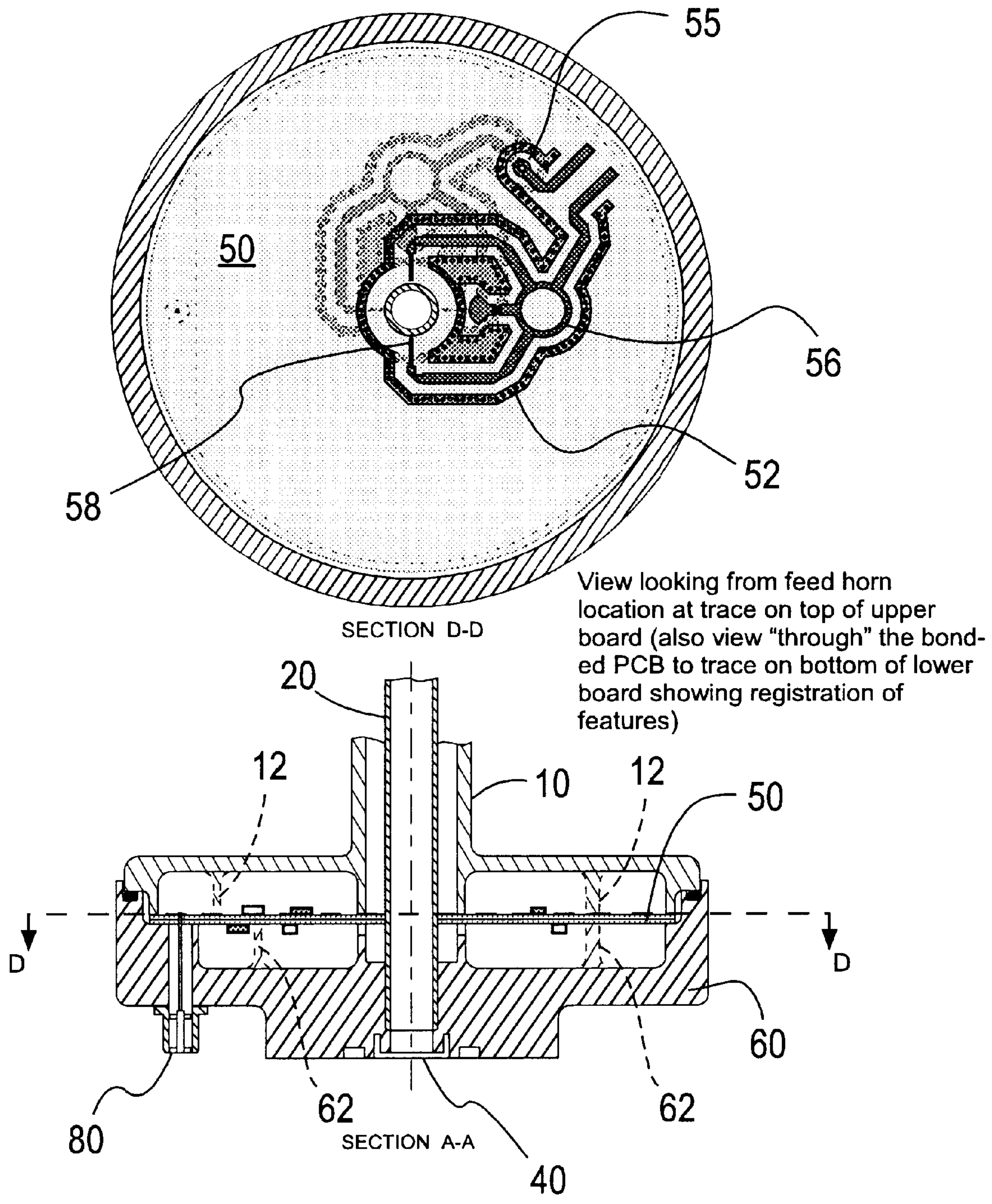
FIG. 8 is a cross-sectional view of the base at the top surface of the PCB.
Figure 9:
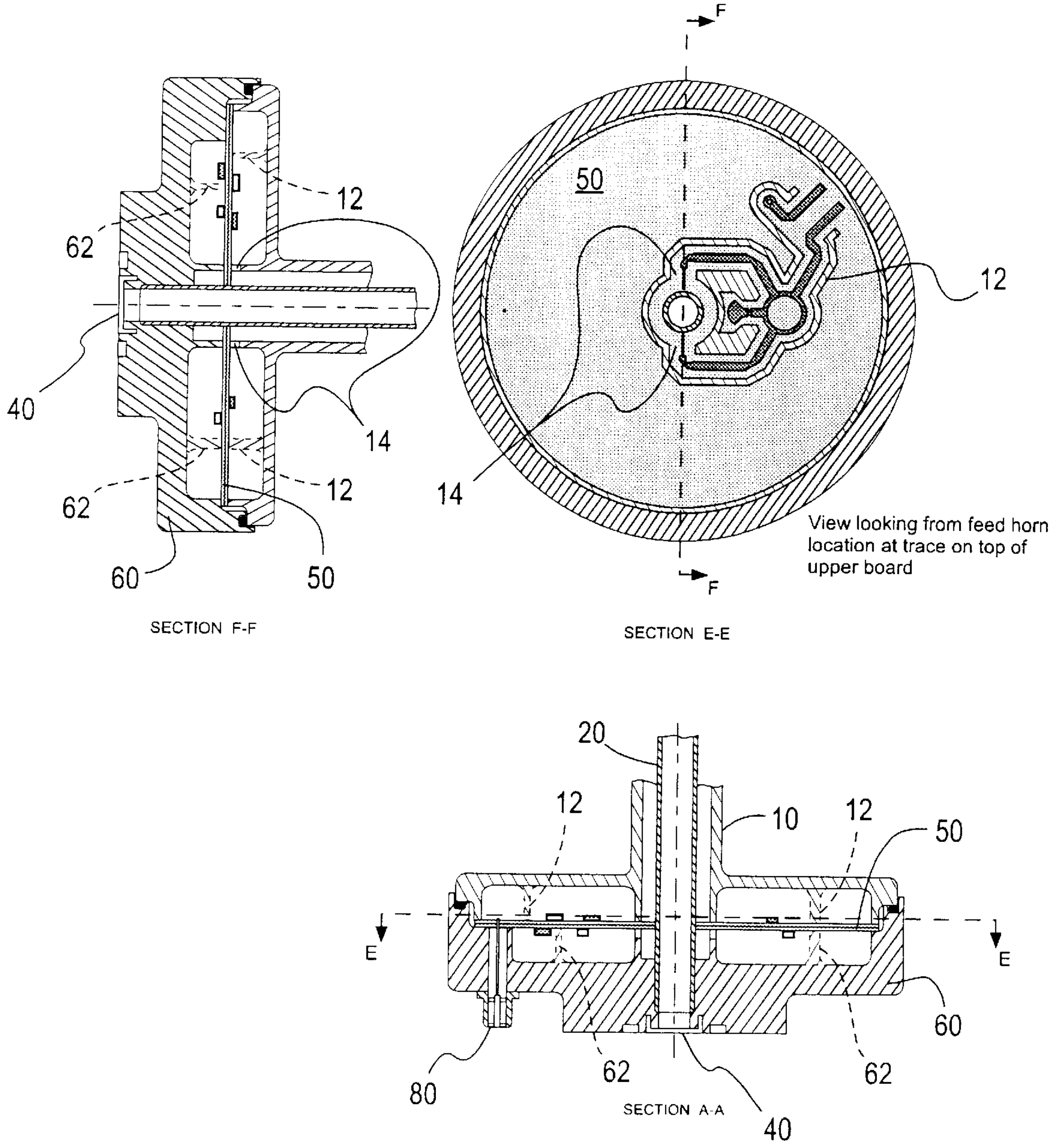
FIG. 9 is a cross-sectional view of the base above the PCB.

FIG. 1 shows an example where the channels are cast into the lower housing but a separate internal sub-cover containing the upper channels is used inside the upper housing. This facilitates easy adjustment of the screw tuning of the dielectric resonant oscillators (DROs) of the LNB electronics with the upper housing cover removed and allows changes in the PCB to accommodate LNB electronics for either a single, twin, quad, or quatro output while re-using the remaining cast parts. As noted on FIG. 3, a circular channel or counterbore of substantially the same diameter as the inside of the coaxial outer conductor is cast into the bottom housing to a specified depth. When combined with the press-fit inner conductor this channel provides an extension of the feed central coaxial transmission line below the PCB 50, the back wall of which forms a backshort 70 whose proximity to the PCB tunes the RF impedance match of the printed probes of the PCB. Pairs of openings 14 in the outer conductor on opposite sides of the feed axis in the central coax region above the PCB proximate the upper pair of probes allow the upper printed probes to enter the central coaxial region without short circuiting to the outer conductor as shown in FIGS. 8 and 9. A similar pair of openings in the extended coaxial region formed by the lower housing backshort channel below the PCB, but rotated 90 degrees about the feed axis, provide the same function for the lower printed probes as shown in FIGS. 6 and 7.

Figure 12:
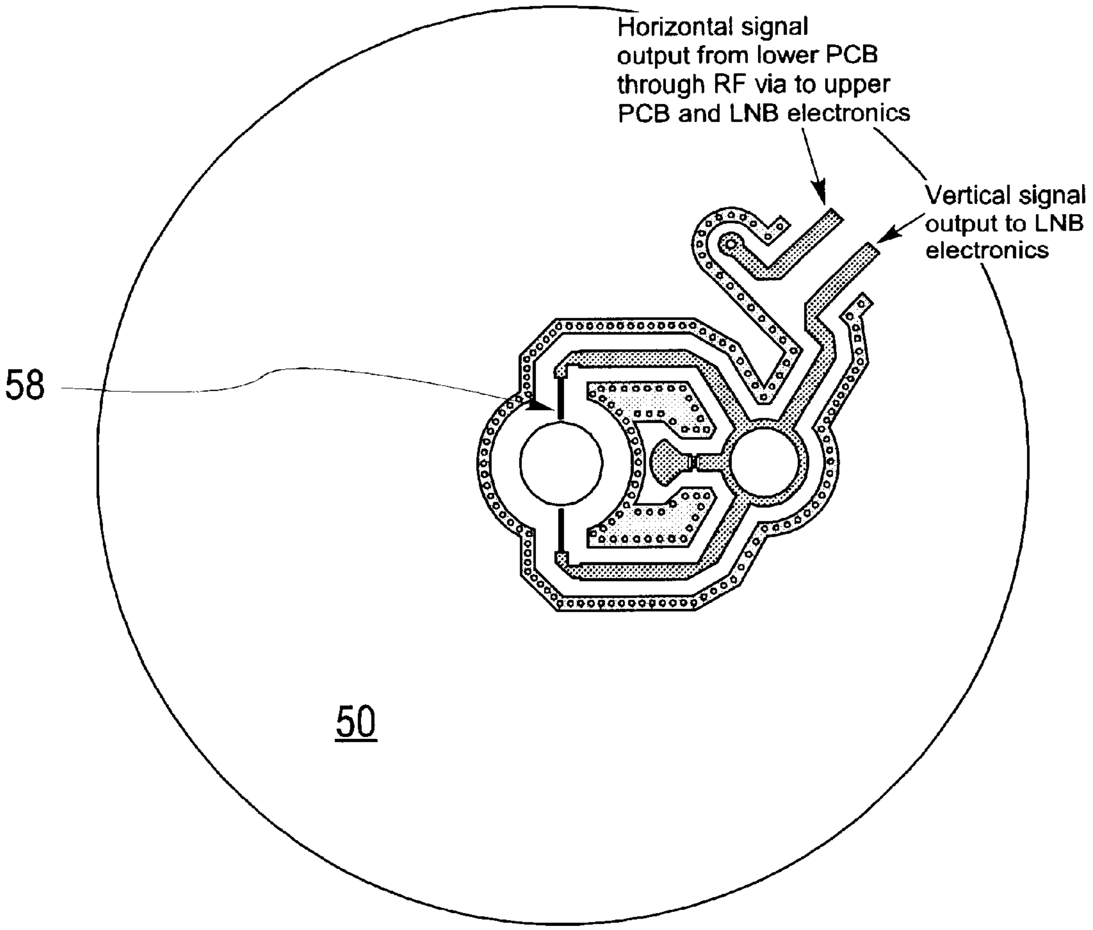
FIG. 12 is a diagram of the top of the PCB.
Figure 13:
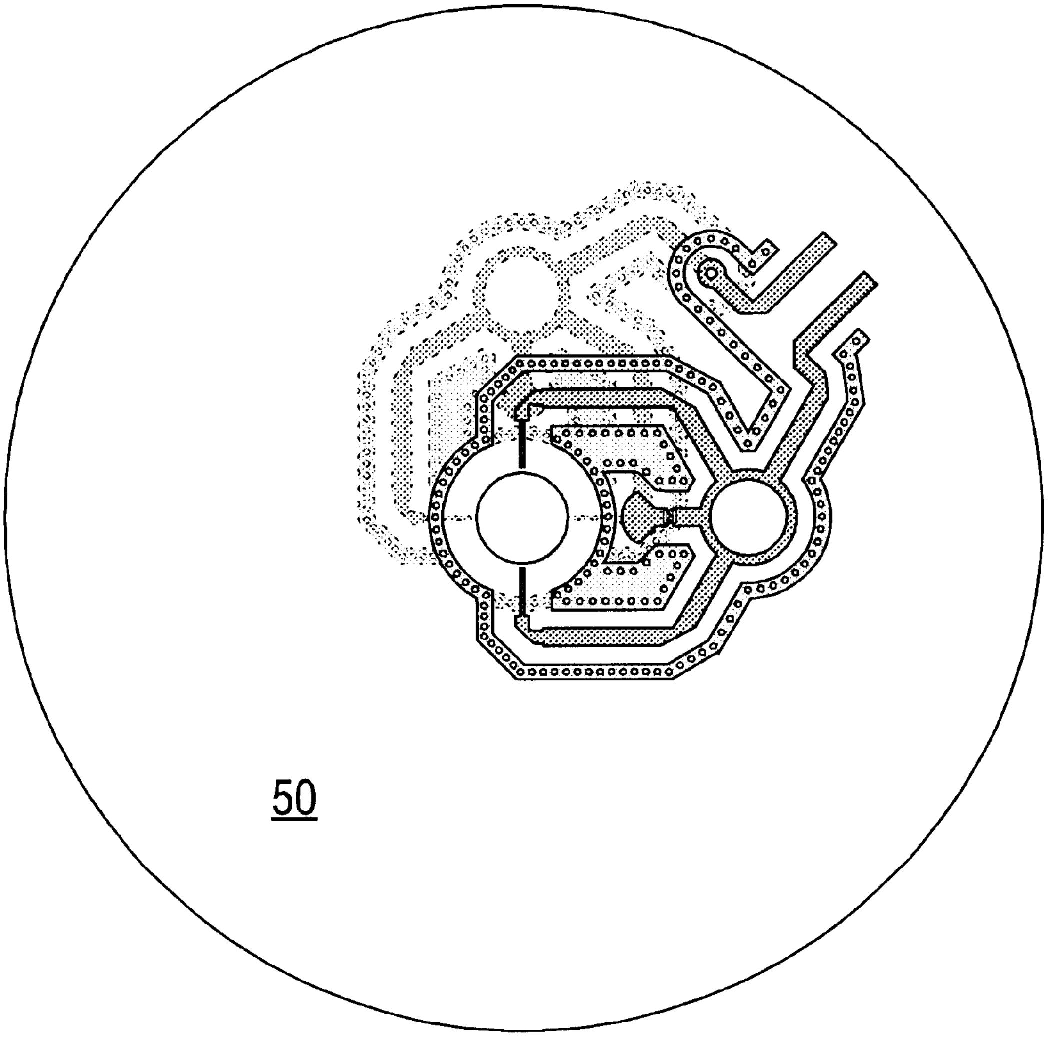
FIG. 13 is a diagram of a portion of the top of the PCB.

As shown in FIGS. 11, 12, and 13, the printed probes 58, 59 may, but do not have to, contact the metal inner conductor that passes through the central hole in the PCP. In the preferred embodiment of the invention the probes 58, 59 do not electrically or physically contact the inner conductor 20 allowing both easy assembly of the inner conductor through the PCB 50 and providing D.C. isolation between the printed probes and the inner conductor and cast housing. This eliminates the need for the often difficult to match D.C. blocking capacitors in the microstrip lines from the probes through to the hybrid which are usually required to isolate the bias lines of active devices of the LNB electronics. For the same reason, the fourth port (or "sum" port) of each hybrid is terminated in a surface mount chip resistor 51 whose other end is shorted to ground by the "virtual" short of a printed radial stub 53. Although shown in FIGS. 11 and 12 to be the same, the upper probe pair may differ from the lower probe pair in length, shape, and in the number and location of the matching step(s) of the configuration in the best practice of the invention. This allows independent tuning of the upper and lower probe pairs to compensate for the lower probes' slightly closer proximity to the coaxial backshort wall (see FIG. 3).

A more costly alternative to the bonded microstrip PCB is a multilayer stripline board with one set of middle layers containing both pairs of printed stripline probes. An upper set of layers with an RF via from each probe of a pair of the probes that are combined in a stripline rat-ace hybrid tops these middle layers. A second set of layers below the middle layers accepts an RF via from each probe of the other pair of probes and combines them in a stripline hybrid. The output of this second hybrid passes to the upper set of layers through a final RF via to the rest of the LNB electronics. The stripline probes could also be implemented using traditional Teflon-glass microfiber, low-loss microwave materials or could be accomplished in low temperature co-fired ceramic (LTCC) in higher manufacturing volumes. The probes may also be realized as a separate daughter board that is bonded and RF coupled to the lower cost PCB of the LNB electronics, possibly eliminating the need for a bonded board for the remaining portion of the LNB electronics.

Figure 14:
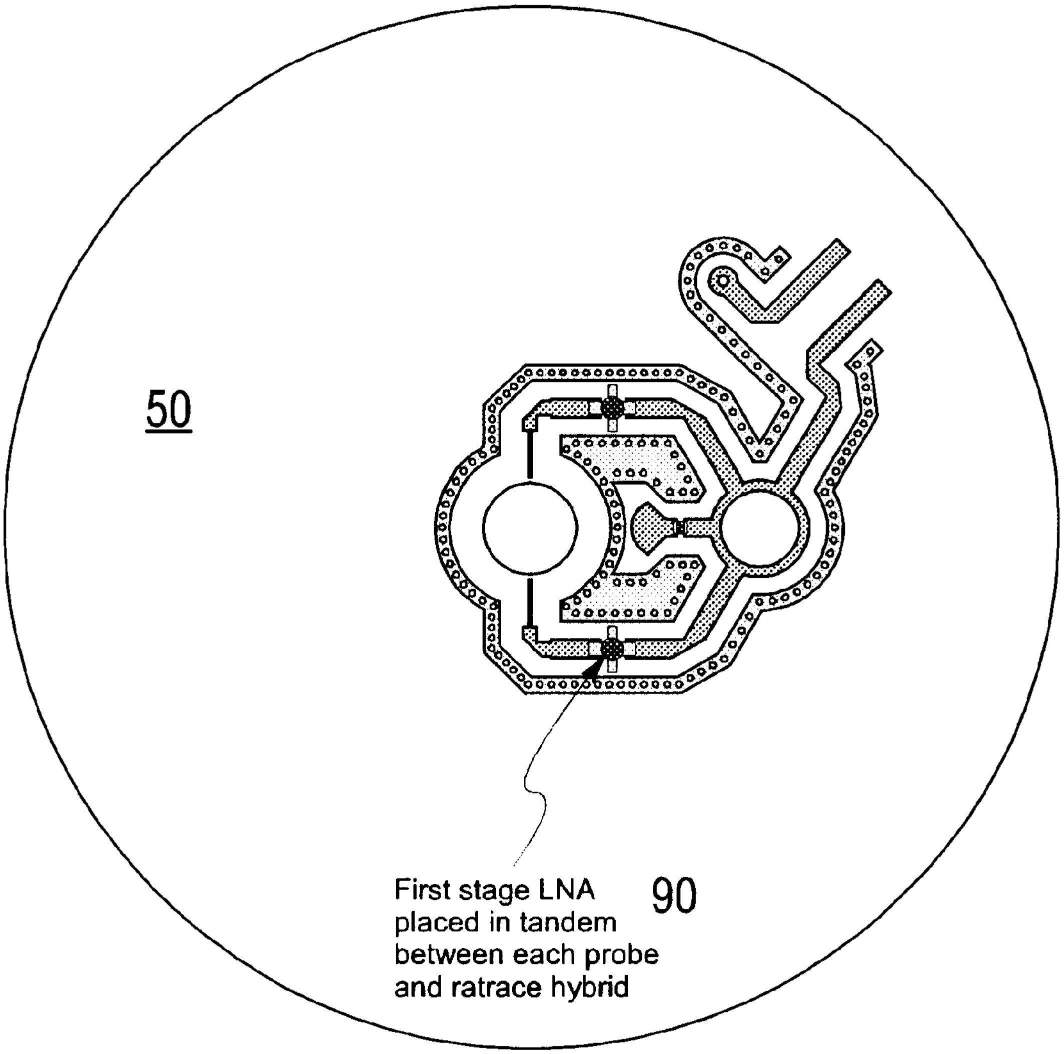
FIG. 14 is a diagram of another portion of the top of the PCB.

Finally, lower-cost, but higher-loss, woven glass PCB boards may be used to implement the invention because there is room to include the first stage of LNB amplification as a pair of low-noise microwave transistors placed in tandem close to the probes and before the hybrids as shown in FIG. 14. Placing the first stage here compensates for the additional dielectric and ohmic loss and improves the Gain/Temperature ratio (G/T). This requires active devices with substantially similar insertion gain and phase delay for best performance at the hybrid combiner since the signals of each probe have not yet been combined at that point in the circuit. Such devices are available today and this was the method used in the best practice.

The inclusion of an integrated receiver front-end in the form of an LNB is highly desirable from both a cost perspective and a logistics viewpoint. The antenna feed provides substantially equal E-plane and H-plane radiation pattern beamwidths of approximately 70 degrees at both Ka and Ku bands for efficient illumination of a subreflector of the antenna terminal regardless of polarization orientation. The antenna feed has low cross-polarization on transmit to avoid cross-talk interference during polarization re-use with adjacent satellites. The antenna feed also provides co-located radiation pattern phase centers in both frequency bands simultaneously so that the terminal antenna optics remains focused without further mechanical adjustment. The antenna feed additionally provides high internal isolation between its transmit and receive ports. Traditional waveguide-based components and multiple feeds require costly alignment in the field and are too bulky and expensive for this commercial application.

The present invention provides a product that meets all the technical requirements established for an antenna feed used in an interactive video and Internet satellite communications application while utilizing technologies and processes that allow the product to be produced at a lower cost (both material and assembly) than traditional methods. In contrast to prior art antenna feeds, the presently disclosed antenna feed is much more compact and requires no mechanical adjustment. Additionally, care was also taken to ensure that the product manufacturing process would utilize automatic machinery whenever possible.

The disclosed feed provides an additional advance over the prior art in part because it replaces older waveguide technology with newer circuit board technology. The complex and demanding requirements of this antenna feed system include the need for a short, low-loss, direct path from the Ka-band transmitter to the antenna feed horn and simultaneous reception of vertical and horizontal polarizations at Ku-band, from the same identical feed horn. The printed circuit board technology allows direct coupling between the coaxial feed and the LNB, avoiding the need for intervening waveguide components. This results in a lower cost, more readily manufactured, and better performing antenna feed system. Moreover, the present invention uses pairs of probes and a hybrid combiner for each polarization, thereby providing direct coupling to the desired $TE_{11}$ mode and further providing high isolation from the undesired but dominant TEM coaxial mode.

Having described preferred embodiments of the invention it will now become apparent to those of ordinary skill in the art that other embodiments incorporating these concepts may be used. Accordingly, it is submitted that that the invention should not be limited to the described embodiments but rather should be limited only by the spirit and scope of the appended claims. All publications and references cited herein are expressly incorporated herein by reference in their entirety.

What is claimed is:

1. An antenna feed comprising:

a feed horn;

an outer conductor in electrical communication with and contiguous to said feed horn;

a hollow inner conductor disposed coaxially within said outer conductor;

a polyrod having at least a portion thereof disposed within said hollow inner conductor and projecting into a throat of said metal feed horn, said polyrod having a shape to provide proper beamwidth and match at a first frequency band; and a printed circuit board (PCB) including a pair of receive channel RF probes, 180-degree hybrid combiner and low noise block (LNB) circuitry for reception of a second frequency band, said second frequency band being of lower frequency than said first frequency band, said PCB mounted generally perpendicular to the axis of said hollow inner conductor, said inner conductor passing through a central aperture in said PCB, said pair of receive channel RF probes located substantially in the plane of the PCB and disposed along a diameter of said outer conductor.

2. The antenna feed of claim 1 wherein said pair of receive channel RF probes is coupled to a $TE_{11}$ coaxial transmission line mode received from said feed horn.

3. The antenna feed of claim 1 further comprising a corrugated ring filter integrated with said feed horn.

4. The antenna feed of claim 1 further comprising an LNB output in electrical communication with said PCB.

5. The antenna feed of claim 1 wherein a first pair of said receive channel RF probes and its associated 180-degree hybrid combiner are dedicated to a first single receive polarization.

6. The antenna feed of claim 5 wherein a second pair of said receive channel RF probes and its associated 180-degree hybrid combiner, oriented orthogonal with respect to said first pair about the axis of said inner conductor, are dedicated to a second single receive polarization orthogonal to said first single receive polarization.

7. The antenna feed of claim 6 wherein said first pair of said receive probes and its associated 180-degree hybrid combiner are rotated approximately 90-degrees from said second pair of receive channel probes and its associated 180-degree hybrid combiner.

8. The antenna feed of claim 7 wherein said first pair of said receive probes is coupled to a $TE_{11}$ coaxial transmission line mode received from said feed horn and said second pair of said receive probes is coupled to a second $TE_{11}$ coaxial transmission line mode received from said feed horn, and wherein said second $TE_{11}$ coaxial transmission line mode is substantially orthogonal to said first $TE_{11}$ coaxial transmission line mode.

9. The antenna feed of claim 5 wherein a second pair of said receive channel RF probes and its associated 180-degree hybrid combiner, oriented orthogonal with respect to said first pair about the axis of said inner conductor, are printed on a lower side of said PCB.

10. The antenna feed of claim 1 wherein a first pair of said receive channel RF probes and its associated 180-degree hybrid combiner are printed on an upper side of said PCB.

11. The antenna feed of claim 1 wherein at least one of said receive channel probes are in electrical contact with said inner conductor.

12. The antenna feed of claim 1 wherein at least one of said receive channel probes are proximate said inner conductor.

13. The antenna feed of claim 1 wherein said PCB comprises one of a multilayer bonded microstrip PCB and a multilayer stripline PCB.

14. The antenna feed of claim 1 further comprising an upper housing attached to said feed horn and said outer conductor.

15. The antenna feed of claim 14 further comprising a lower housing attached to said upper housing, said lower housing and upper housing mating together and surrounding said PCB.

16. The antenna feed of claim 15 wherein at least one of said upper housing and said lower housing are in electrical communication with said PCB.

17. The antenna feed of claim 15 wherein an electrically-conductive subcover is disposed between said upper housing and PCB, said electrically-conductive subcover in electrical contact with portions of said PCB providing channelization of RF energy for increased isolation between adjacent signal traces.

18. The antenna feed of claim 15 wherein an electrically-conductive subcover is disposed between said lower housing and PCB, said electrically-conductive subcover in electrical contact with portions of said PCB providing channelization of RF energy for increased isolation between adjacent signal traces.

* * * * *

UNITED STATES PATENT AND TRADEMARK OFFICE

CERTIFICATE OF CORRECTION

PATENT NO. : 6,720,933 B2
APPLICATION NO. : 10/315608
DATED : April 13, 2004
INVENTOR(S) : Hanlin et al.

It is certified that error appears in the above-identified patent and that said Letters Patent is hereby corrected as shown below:

Column 3, line 58-59 delete “prior art expensive” and replace with --prior art, expensive--.

Column 4, line 21 delete “provide” and replace with --provides--.

Column 5, line 13 delete “flexibility the channels” and replace with --flexibility, the channels--.

Column 5, line 40 delete “provide” and replace with --provides--.

Column 7, line 8-9 delete “invention it will” and replace with --invention, it will--.

Column 7, line 11 delete “submitted that that the” and replace with --submitted that the--.

Abstract Line 4, delete “KU-band” and replace with --Ku-band--.

Signed and Sealed this

First Day of August, 2006

Jon W. Dudas

JON W. DUDAS
*Director of the United States Patent and Trademark Office*